United States Patent [19]

Hara et al.

[11] Patent Number: 4,530,582
[45] Date of Patent: Jul. 23, 1985

[54] EXPOSURE APERTURE FRAME CONSTRUCTION FOR CAMERA

[75] Inventors: Hiroshi Hara, Tokyo; Takashi Tobioka, Saitama; Takeshi Yoshino, Saitama; Tetuo Nishikawa, Saitama; Jiro Sekine, Tokyo, all of Japan

[73] Assignee: Fuji Photo Film Co., Ltd., Kanagawa, Japan

[21] Appl. No.: 537,423

[22] Filed: Sep. 29, 1983

[30] Foreign Application Priority Data

Apr. 10, 1982 [JP] Japan ................ 57-149807

[51] Int. Cl.³ .................. G03B 1/48; G03B 19/04
[52] U.S. Cl. .................... 354/203; 354/212; 242/71.1
[58] Field of Search ............ 354/203, 212, 288; 242/71.1

[56] References Cited

U.S. PATENT DOCUMENTS 3,383,068  5/1968  Winkler et al. ............ 242/71.1
3,463,071  8/1969  Winkler et al. ............ 354/212

Primary Examiner—A. A. Mathews
Attorney, Agent, or Firm—Young & Thompson

[57] ABSTRACT

An exposure aperture frame defining an exposure aperture includes at least a pivotable partition member with an inclined guide surface on the inner wall thereof which is pivoted by and thereby permits advancement of a film leader to a film take-up chamber so that the film leader can reach a film take-up chamber without any standstill within the exposure aperture frame. The inclined guide surface permits the forward end of the film leader to ride across the partition member. A spring urges the partition member toward a position in which it encloses the exposure aperture frame. That spring also releasably retains the partition member on a shaft on which it is pivoted. The partition member has a platform member extending toward the take-up chamber, which has an opening therethrough that provides access to the spring.

6 Claims, 4 Drawing Figures

EXPOSURE APERTURE FRAME CONSTRUCTION FOR CAMERA

BACKGROUND OF THE INVENTION

The present invention relates to an exposure aperture frame construction for an auto-loading camera which is adapted to receive a film container including a coiled filmstrip and to load a film automatically therein.

Recently, there have been proposed several kinds of auto-loading cameras which are provided with a film advancing means such as a sprocket drum or endless belt adjacent to a film supply chamber which, in turn, receives a film container including a coiled filmstrip having a leader extending therefrom, and a film take-up spool located in the film take-up chamber of the camera which operates to automatically wind the advanced film leader into the film take-up chamber. In such a camera, film loading can be completed only by closing a back cover after insertion of a film container into the film supply chamber. The filmstrip contained in a container generally has a leader previously drawn into some extent out of the container, the length of which, as is well known to those in the art, depends on the brand.

One of the problems associated with auto-loading cameras using such containers with different length of film leaders drawn out therefrom as abovementioned is failure in the film loading operation of the film leader to reach the automatic take-up spool in the film take-up chamber, resulting in unsuccessful winding of the film leader around the automatic take-up spool because the insufficient film leader previously drawn out of the film leader is liable to be caught inside an exposure aperture frame due to its curled leader.

To eliminate the aforementioned problem from such auto-loading cameras, there has been proposed a novel exposure aperture frame structure disclosed in Japanese Pat. Application Ser. No. 55-186576 by the same applicant of this application wherein the exposure aperture frame has a partition in the form of a pivotally mounted door which can be pivotally moved by and thus permits advancement of a film leader to a film take-up chamber of the camera.

The exposure aperture disclosed in the Japanese Pat. Application, however, does not solve the problem for tightly curled, specialized or otherwise complicated film leaders. That is to say, a door member as a partition of the exposure aperture frame which is merely pivotally mounted does not always ensure that the film leader is successfully directed to the film take-up chamber, because the leading end of the leader pushes the door open while it is still caught inside the upper portion of the door.

OBJECT OF THE INVENTION

It is accordingly an object of the present invention to provide an improved exposure aperture frame for auto-loading cameras which assures advancement of film leaders to a film take-up chamber irrespective of differences in length, shape or curling thereof.

It is another object of the present invention to provide an improved exposure aperture frame for auto-loading cameras which is mounted on a camera body so as to be easily removed for the sake of repairing or cleaning its interior mechanism.

It is still another object of the present invention to provide an improved exposure aperture frame which can be manufactured by a simplified process and thereby at low cost.

SUMMARY OF THE INVENTION

In accomplishing these and other objects there has been provided in accordance with the present invention an exposure aperture frame for auto-loading cameras which includes a pivotally mounted partition taking the form of a door which, in turn, has an surface on the opposite side include toward a film supply chamber for directing a film leader to the film take-up chamber. Such an exposure aperture frame permits reliable advancement of any film leader to the film take-up chamber, even if it is short, special in shape or tightly curled. The door is adapted to be detachably mounted on a shaft and to be releasably engaged by a leaf spring, so that it is easily incorporated into and removed from a camera for repairing or cleaning an interior mechanism of the camera.

Furthermore, a platform member the provision of which permits the arrival of the film leader at the film take-up chamber without any standstill is formed integrally with the partition, by which a simplified and low cost manufacturing of the exposure aperture frame is achieved.

BRIEF DESCRIPTION OF THE DRAWINGS

The foregoing and other objects, features and advantages of the present invention will be apparent from the following detailed description of the preferred embodiment of the present invention as illustrated in the accompanying drawings wherein.

DETAILED DESCRIPTION OF THE PRESENT INVENTION

Because film advancing mechanisms and other essential parts for camera are well-known to those skilled in the art, the present description will be directed in particular to elements forming part of, or cooperating more directly with, the present invention, elements not specifically shown or described herein being understood to be selectable from those known in the art.

Before the description of the present invention proceeds, it is to be noted that like parts are designated by like numerals and symbols throughout several views of the accompanying drawings.

Figure 1:
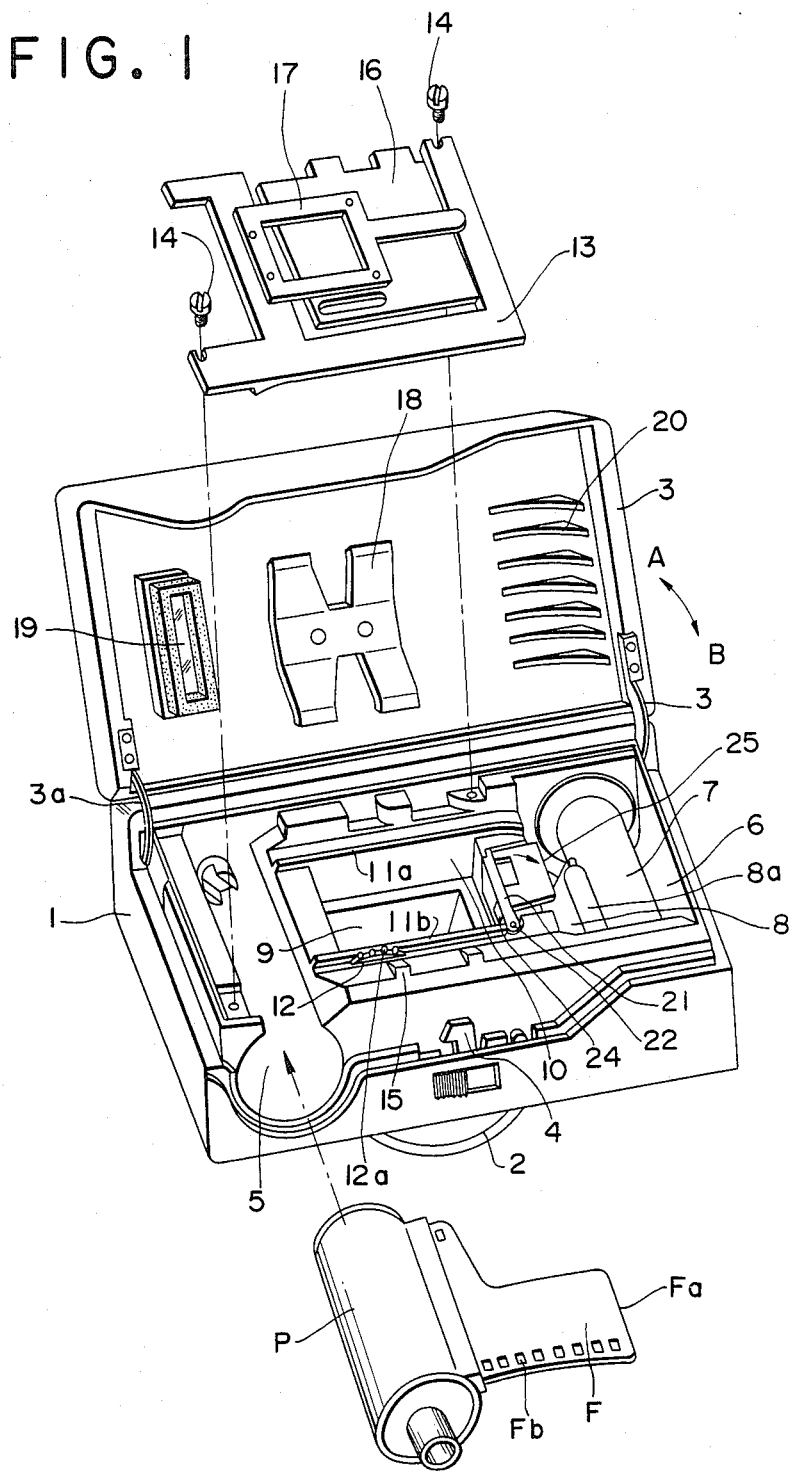
FIG. 1 is a partially exploded perspective view of the camera with its back cover fully opened and with which an exposure aperture frame construction embodying the present invention cooperates.

Referring first to FIG. 1, there is shown a camera with its back cover fully opened which is provided with an exposure aperture frame in accordance with the present invention. A camera body 1 having essential mechanisms installed therein and an objective or taking lens 2 mounted thereon is provided with a back cover 3 which, in turn, has swing arms 3a pivotally connected to the camera body 1 for pivotal opening and closing movement in the direction shown by an arrow A-B. The back cover 3 is adapted to be maintained in its closed position by means of a latch member 4 located on the bottom portion of the camera body 1 in a well-known manner. The camera body 1 is further provided with a film supply chamber 5 into which a film container P is inserted endwise, i.e., axially into an entrance opening at the bottom of the camera body 1 and a film take-up chamber 6 wherein a take-up spool 7 and an film auto-loading arrangement well-known per se are disposed. The arrangement comprises, for instance, a guide plate 8 having a roller 8a rotatably secured thereto which, in turn, is pivotably mounted on the camera body 1 and urged by means of a spring so as to conduct a film leader F toward the inside of the film take-up chamber 6 and then to press, by the roller 8, the conducted film leader F onto the peripheral surface of the take-up spool 7 for automatic film loading. Between the film supply chamber 5 and film take-up chamber 6 an exposure aperture 9 is defined by an exposure aperture frame 10 as described in detail later through which scene light passes and then impinges upon film. On both outer sides of the exposure aperture 9 there are provided guide rails 11a and 11b parallel to each other to hold film flat in the focal plane on which an image of an object to be photographed is properly formed by the taking lens 2. There is further provided outside the lower guide rail 11b and in the vicinity of the mouth of the film take-up chamber 5 a film advancing means 12 such as an endless belt having a series of teeth 12a provided on the outer peripheral surface thereof for engagement with perforations Fb formed in a marginal portion of the film. Locating the endless belt 12 as film advancing means in the vicinity of the mouth of the film supply chamber 5 results in that the teeth 12a can positively enter into the perforations Fb of the film leader F when the film container P is inserted for threading the film leader in a passageway into the film supply chamber 5. A supporting member designated at 13 which has a pressure plate 16 resiliently coupled thereto is rigidly secured to the camera body 1 by means of set screws 14 to provide a straight slot in cooperation with guide surfaces 15 through which the film leader F which is normally curled is held straight and inserted edgewise first into the passageway between the pressure plate 16 and the guide rails 11a and 11b as the film container P is inserted into the entrance opening to the film supply chamber 5 for film loading. Resilient coupling of the pressure plate 16 to the supporting member 13 permits the pressure plate 16 to move away from the guide rails 11a and 11b, providing enough space for threading the film leader F when the back cover 3 is opened. As is apparent in FIG. 1 the pressure plate 16 is urged by leaf spring 18 mounted on the back door 3 to press the film against the guide rails 11a and 11b and thereby hold it flat in the focal plane when the back cover 3 is fully closed. A transparent member denoted by numeral 19 is a window provided in the back cover 3 through which the film container P is visually recognizable.

Figure 2:
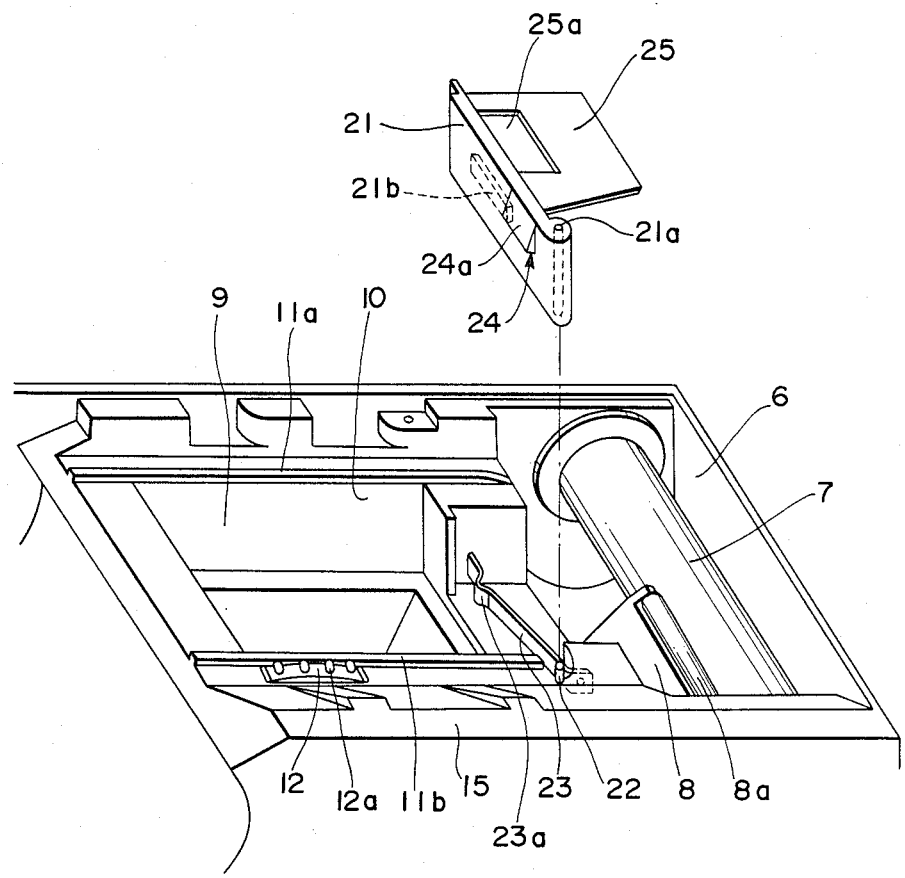
FIG. 2 is a partially exploded perspective view of the exposure aperture frame construction shown in FIG. 1.
Figure 3:
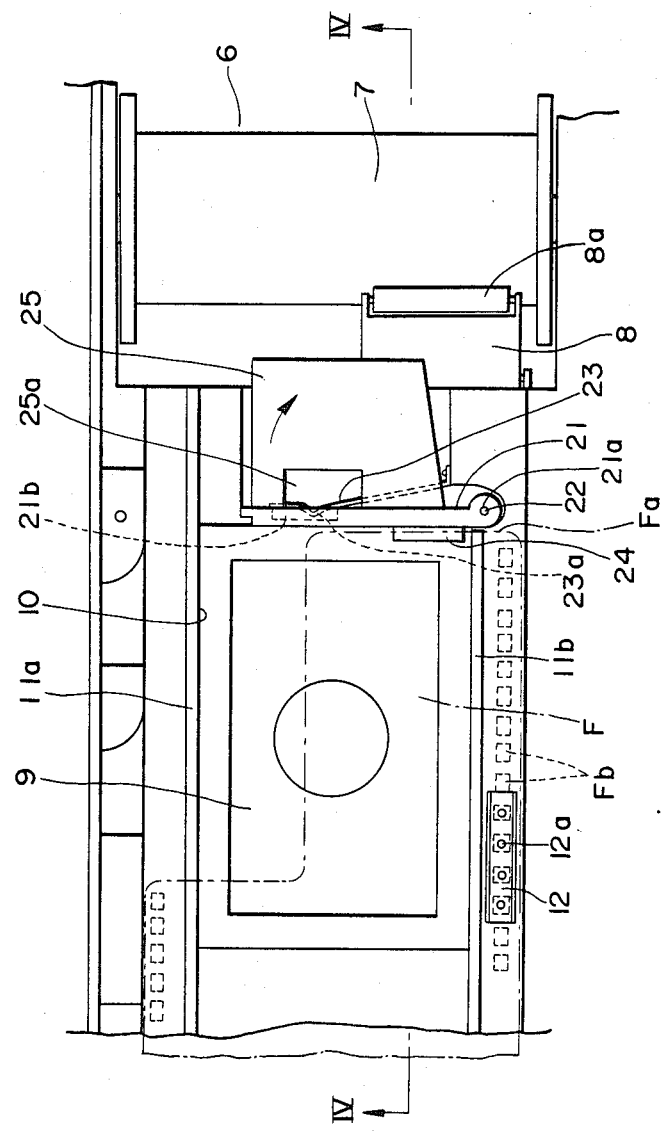
FIG. 3 is a partial elevational view of the exposure aperture frame construction also shown in FIG. 1.
Figure 4:
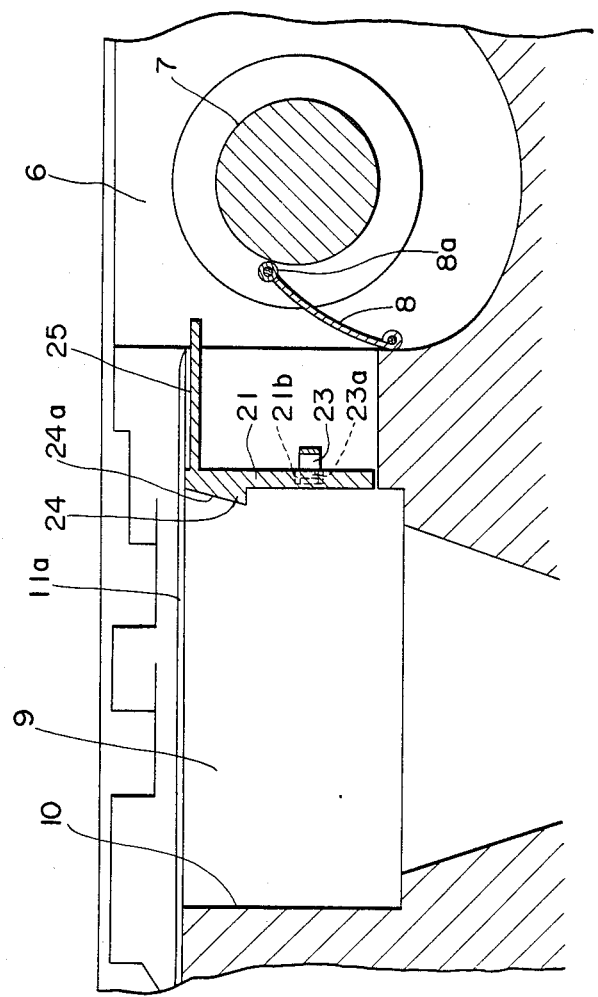
FIG. 4 is an enlarged fragmentary cross sectional view taken along line IV—IV of FIG. 3.

Turning now to FIGS. 2 to 4 a door member 21 forming a partition of the exposure aperture frame 10 is located opposite to the film take-up chamber 6 and is pivotably mounted on a pivot pin 22 through a bore 21a. The door member 21 serves as a partition and is toward a position where it defines one side of the exposure aperture 9 by means of a leaf spring 23 having a projection 23a at its one end portion which enters into a recess 21b formed in the outer side wall of the door for the purpose of preventing the door member 21 from coming off the pivot pin 22.

On the inner side wall of the door member 21 there is provided a guide means 24 having an inclined surface 24a located in an axial position where unwanted light rays for forming an image are blocked thereby. The provision of the guide means permits the film leader to ride across the door member 21 when it is advanced toward the film take-up chamber 6. The door member 21 is further provided with a platform member 25 extending toward the film take-up chamber 6 from the top of the outer wall thereof for preventing the film leader F which has ridden across the door member 21 from falling into a space adjacent the take-up spool 7 and for thereby successively winding the film leader F onto the take-up spool 7. As shown in FIG. 2 there is formed an opening 25a in the platform for easy access to the leaf spring therethrough in order to engage and disengage the projection 23a with the recess 21b of the door member 21 for assembling and removing the door member 21 from the camera body 1.

The film loading operation in this embodiment will be described hereinafter. The film container P is first inserted endwise, i.e., axially into the film supply chamber 5 from which the film leader F is extended toward the film take-up chamber 6 and is inserted edgewise, i.e., longitudinal edge first into the straight slot provided by the supporting member 13. Then the curled leader F is held straight and threaded in the passageway defined by the pressure plate 16 and guide surfaces 15. As a result of this, insertion of the film container P into the film supply chamber 5 is completed and the drawn film leader F is located over the exposure aperture 9. After the completion of insertion of the film container P into the film supply chamber 5, the film leader F is pressed against the guide rails 11a and 11b by the pressure plate 16 which is urged by the leaf spring 18 as the back cover 3 is fully closed and thereby held in the focal plane of the taking lens 2. At this time, the film leader F, if insufficient to extend beyond the exposure aperture frame, may fall at its forward end Fa into the exposure aperture 9 because of its curling. The completion of insertion of the film container P with the insufficient film leader F extending therefrom is followed by the circular movement of the endless belt 12 which is caused by the rotational movement of a driving means and thereby advanced to the film take-up chamber 6. As a result of this, the forward end of the film leader F pushes the guide means 24 and hence forces the door member 21 to rotate clockwise as shown by the arrow against the leaf spring 23. About the same time, the forward end of the film leader is forwardly advanced along the inclined side surface 24a of the guide means 24 to the top of the door member 21, finally riding across the door member 21. The forward end Fa of the film leader F, after riding across the movable door member 21, permits it to pivot counterclockwise under the influence of force of the leaf spring 23 so as to enclose the exposure aperture frame 10. The film leader F thus having ridden thereacross is further advanced with the forward end Fa guided by the platform member 25 and reaches the film take-up chamber 6. When just enough of the film leader F to reach the roller 8a rotatably secured to the guide plate 8 is advanced, the forward end Fa thereof is pressed by the roller 8a against the adjoining portion of the take-up spool 7 and thereby wound therearound so as to form a succession of convolutions. In this manner, the film is wound automatically endwise onto the film take-up spool 7.

Although the present invention has been fully described by way of example with reference to the accompanying drawings, it is to be noted that various changes and modifications will be apparent to those skilled in the art. Therefore, unless otherwise such changes and modifications depart from the scope of the present invention, they should be construed as included therein.

What is claimed is:

1. An exposure aperture frame structure defining an exposure aperture for a camera of the type automatically loading a film therein: said frame structure comprising at least a partition member mounted for pivotal movement about an axis perpendicular to the plane in which the film is disposed in the exposure aperture, said member forming a part of said exposure aperture frame which is pivoted about said axis by a film leader and guide means provided at one side of said partition member which has an inclined surface for causing the forward end of said film leader to ride across said parition member, pivotal movement of said partition member being caused by and thereby permitting advancement of said film leader to a film take-up chamber wherein a film is wound automatically onto a film take-up spool.

2. An exposure aperture frame structure as defined in claim 1, wherein said partition member is detachably mounted on a shaft fixed to the camera.

3. An exposure aperture frame structure as defined in claim 2, wherein said partition member is urged by a spring to enclose the exposure aperture frame and is releasably retained on said shaft by said spring.

4. An exposure aperture frame structure as defined in claim 1, wherein said partition member further includes a platform member at the side opposite to said one side on which said guide means is provided, for smooth advancement of said film leader to said film take-up chamber.

5. An exposure aperture frame structure as defined in claim 4, wherein said partition member is urged by a spring to enclose the exposure aperture frame and is releasably retained on said shaft by said spring, and said platform member is provided with an access opening therethrough for access to said spring.

6. An exposure aperture frame structure as defined in claim 1, wherein said partition member is disposed in a plane perpendicular to the plane in which the film is disposed in the exposure aperture.

* * * * *

UNITED STATES PATENT AND TRADEMARK OFFICE
CERTIFICATE OF CORRECTION

PATENT NO. : 4,530,582
DATED : July 23, 1985
INVENTOR(S) : Hiroshi HARA et al.

It is certified that error appears in the above—identified patent and that said Letters Patent is hereby corrected as shown below:

On the title page;
    In the Foreign Application Priority Data, change the filing date of the Japanese application to --October 4, 1982--.

*Signed and Sealed this*

*Twenty-second* Day of *October 1985*

[SEAL]

*Attest:*

*Attesting Officer*

DONALD J. QUIGG

*Commissioner of Patents and Trademarks—Designate*